United States Patent [19]

Moen

[11] 4,262,700

[45] Apr. 21, 1981

[54] BROAD-BAND PULSATION ATTENUATOR

[75] Inventor: Carl J. Moen, Beloit, Wis.

[73] Assignee: Beloit Corporation, Beloit, Wis.

[21] Appl. No.: 21,082

[22] Filed: Mar. 16, 1979

[51] Int. Cl.³ .......................................... F16L 55/04
[52] U.S. Cl. ...................................... 138/26; 138/30; 162/336; 162/380; 181/233; 181/237; 181/252
[58] Field of Search ...................... 162/216, 336, 380; 138/26, 30; 137/593; 181/236, 237, 279, 233, 252, 258

[56] References Cited

U.S. PATENT DOCUMENTS

| | | | |
|---|---|---|---|
| 2,766,840 | 10/1956 | Munroe | 181/233 |
| 3,063,470 | 11/1962 | Furster | 138/30 |
| 3,473,565 | 10/1969 | Blendermann | 138/30 |
| 4,030,971 | 6/1977 | Justus | 162/216 |

*Primary Examiner*—William F. Smith
*Assistant Examiner*—Steve Alvo
*Attorney, Agent, or Firm*—Hill, Van Santen, Steadman, Chiara & Simpson

[57] ABSTRACT

An insert type attenuator arranged to function as a broad-band frequency rejection filter for pulsations in a liquid in a conduit, such as a liquid stock suspension being fed via a pipe line to a paper making headbox, which includes a housing, a conduit positioned within the housing, and a flexible diaphragm having a pair of substantially horizontal spaced runs positioned in the conduit, with means for flowing the stock suspension through the conduit, and means for introducing pressurized gas into and bleeding gas from the housing and the space between the diaphragm runs. Valve means operate intermittently in response to gross outward deflection of one or both of the runs, caused by long-term liquid pressure decreases and/or gradual increases of gas pressure build-up, to vent gas from between the runs and from the housing, and thus to maintain adequate matching of the pressures of the gas cushion and of the liquid. This maintaining of the diaphragm in a neutral, sensitively responsive condition permits it to deflect instantaneously, in both directions, as required, to reflect pulsations in the liquid.

8 Claims, 10 Drawing Figures

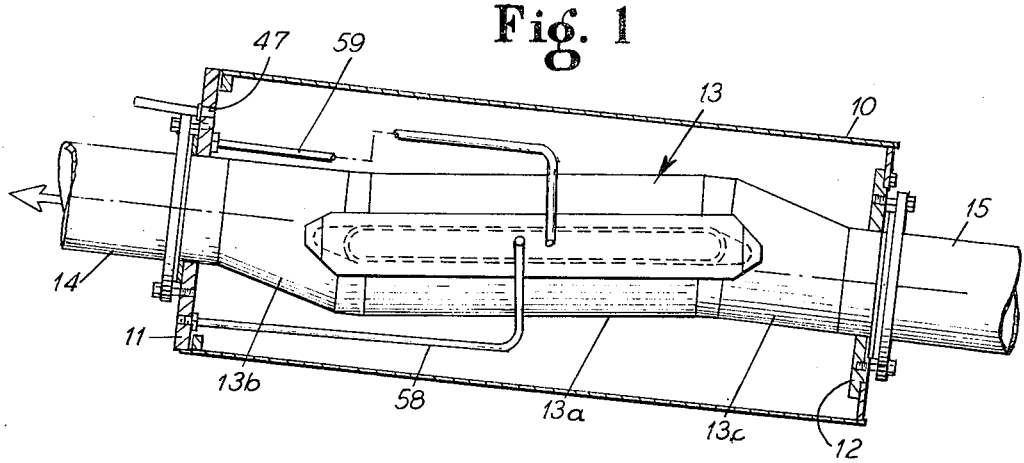
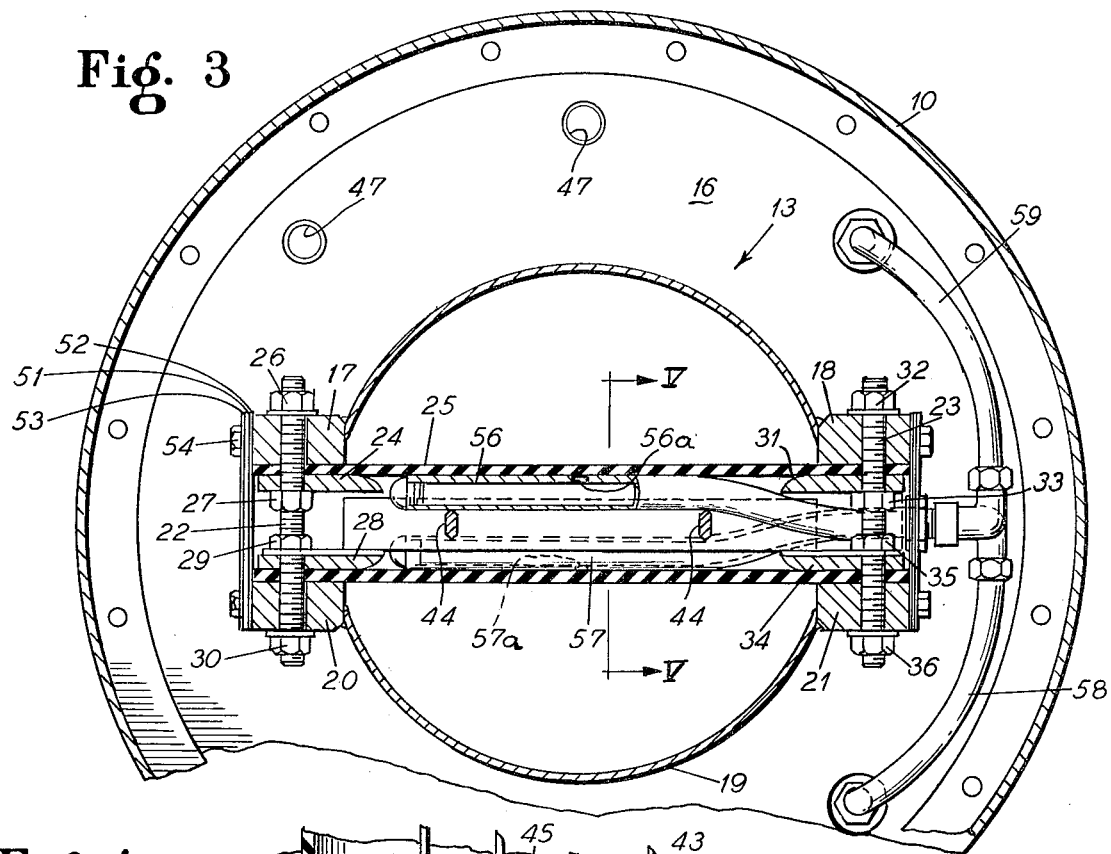
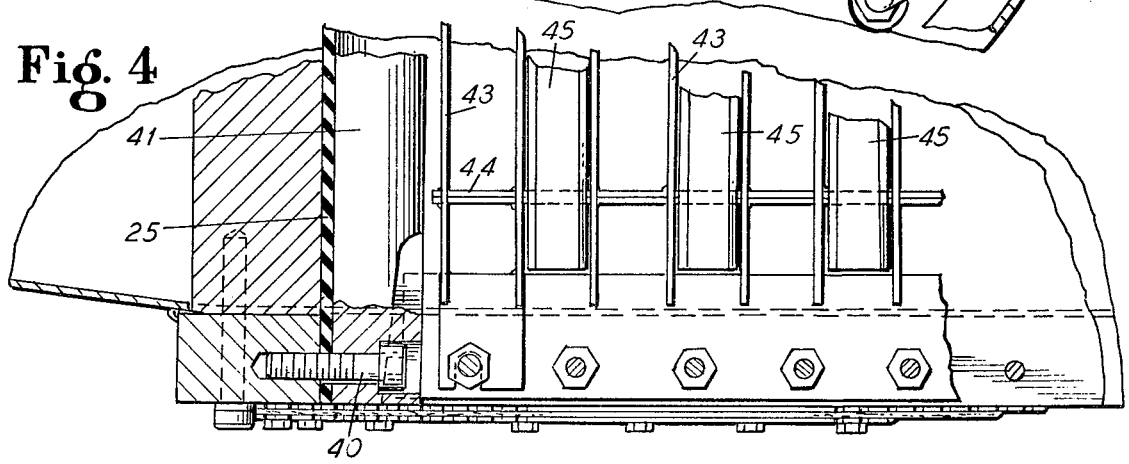

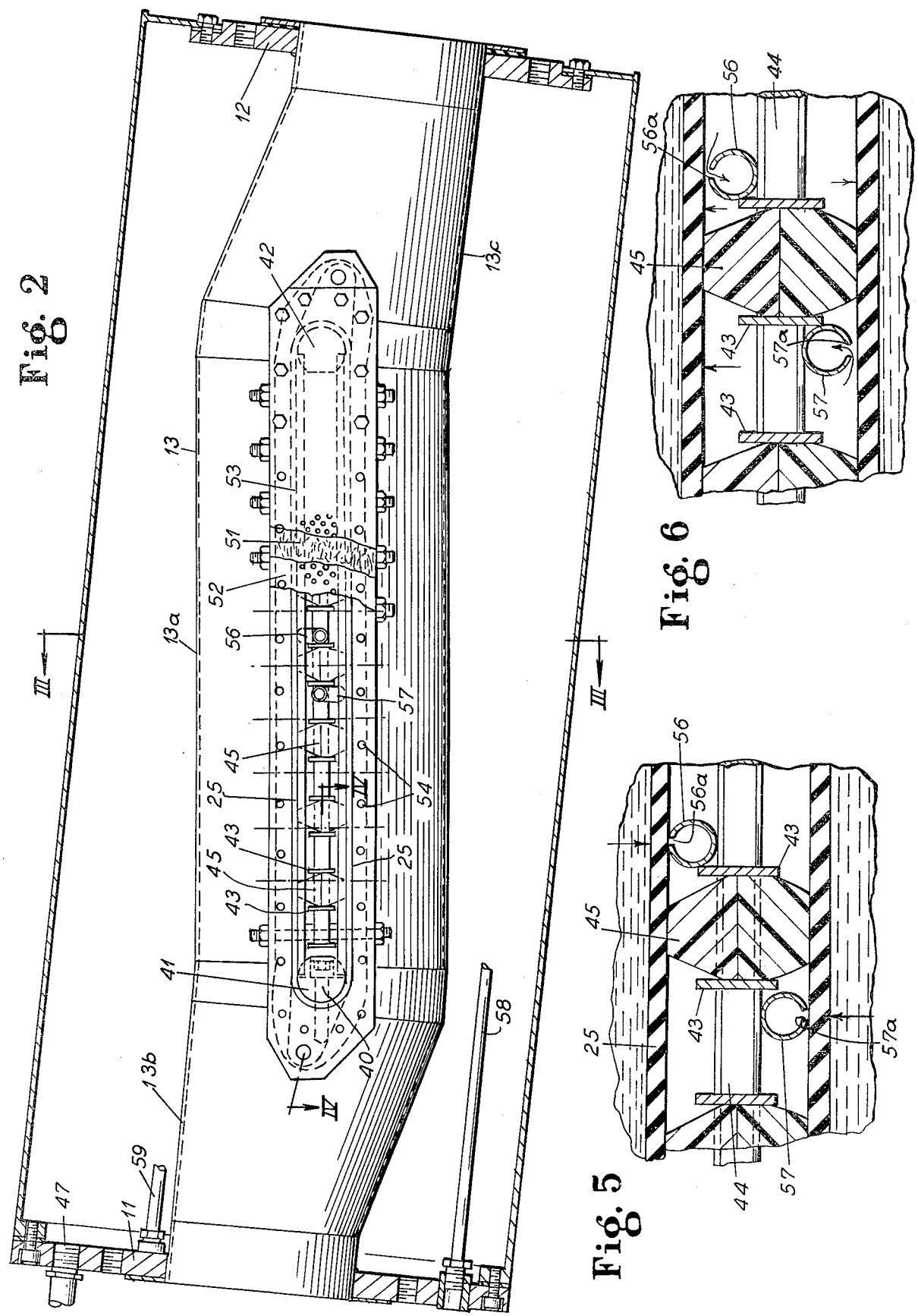

BROAD-BAND PULSATION ATTENUATOR

BACKGROUND OF THE INVENTION

1. Field of the Invention

This invention is in the field of attenuators or mufflers, or more specifically, insert type attenuators designed to smooth out pulsations, that is, fluctuations in pressure and flow, in a liquid or liquid suspension such as one being fed to a paper making headbox, and providing a sensitive, automatically balanced system including a flexible diaphragm responsive to fluctuations in the pressure of the stock suspension on one side and cushioned by and positioned by an automatically controlled gas pressure on the other side.

2. Description of the Prior Art

In stock lines feeding paper machines, it is highly desirable that the fluid be delivered at a steady rate. In the case of a paper machine stock system, pulsations in the stock suspension which might be caused by pumps or screens or the like or by disturbances such as cavitation may lead to "barring" of the paper being produced. This defect, variations in the area density of the paper in the machine direction, is accompanied by or causes other problems both in manufacturing and in using the paper.

Several approaches have been tried to solve the problem of basis weight or wet-end barring. One approach is to reduce the magnitude of fluctuations contributed by sources such as pumps and screens. Selection, redesign, and more strict tolerances in manufacture and in field installation as well as attention to fluid dynamics are of some help in achieving reduction. A more universal approach is the use of a properly designed and properly applied attenuator or acoustic filter which should reduce the magnitude of the undersired fluctuating or ac components of the flow significantly without significantly interfering with the steady or dc component of flow.

A theoretical and practical discussion of basis weight barring, and the governing principles of attenuation using filters of the reactive type will be found in my two papers published in Volume 60, No. 10 of "Tappi" (October 1977), and in the succeeding issue, Volume 60, No. 11 (November 1977).

SUMMARY OF THE INVENTION

The present invention provides an insert type attenuator arranged to function as a reflector of pulsations in a liquid suspension such as one being fed to a headbox. It includes an outer housing, and a conduit positioned within the housing. Both the housing and the conduit preferably have essentially circular cross sections over much of their lengths. A flexible diaphragm which may be in the form of an endless belt having two essentially horizontally extending spaced runs is positioned in the conduit and secured thereto. A stock suspension is flowed through the conduit along opposite faces of the spaced runs of the diaphragm. A gas is introduced continuously into the housing and into the space between the two diaphragm runs. A value means which may consist of a pair of pipes closed at one end and having apertures abutting the runs is normally closed by the pressure of the stock suspension against the opposite faces of the diaphragm runs.

BRIEF DESCRIPTION OF THE DRAWINGS

The drawings illustrate a preferred embodiment of the structure of the present invention and the manner in which it is used. In the drawings:

FIG. 1 is an overall view, partly broken away, of an insert type attenuator embodying the improvements of the present invention;

FIG. 2 is a fragmentary view, partly broken away and partly in cross section, illustrating the interior construction of the attenuator more completely;

FIG. 3 is a cross-sectional view taken substantially along the line III—III of FIG. 2;

FIG. 4 is a fragmentary cross-sectional view taken substantially along the line IV—IV of FIG. 2;

FIG. 5 is an enlarged fragmentary cross-sectional view taken substantially along the line V—V of FIG. 3, illustrating the condition at which the valve means is closed;

FIG. 6 is a view similar to FIG. 5 but illustrating the condition where the valve means is open;

DESCRIPTION OF THE PREFERRED EMBODIMENTS

Figure 7:
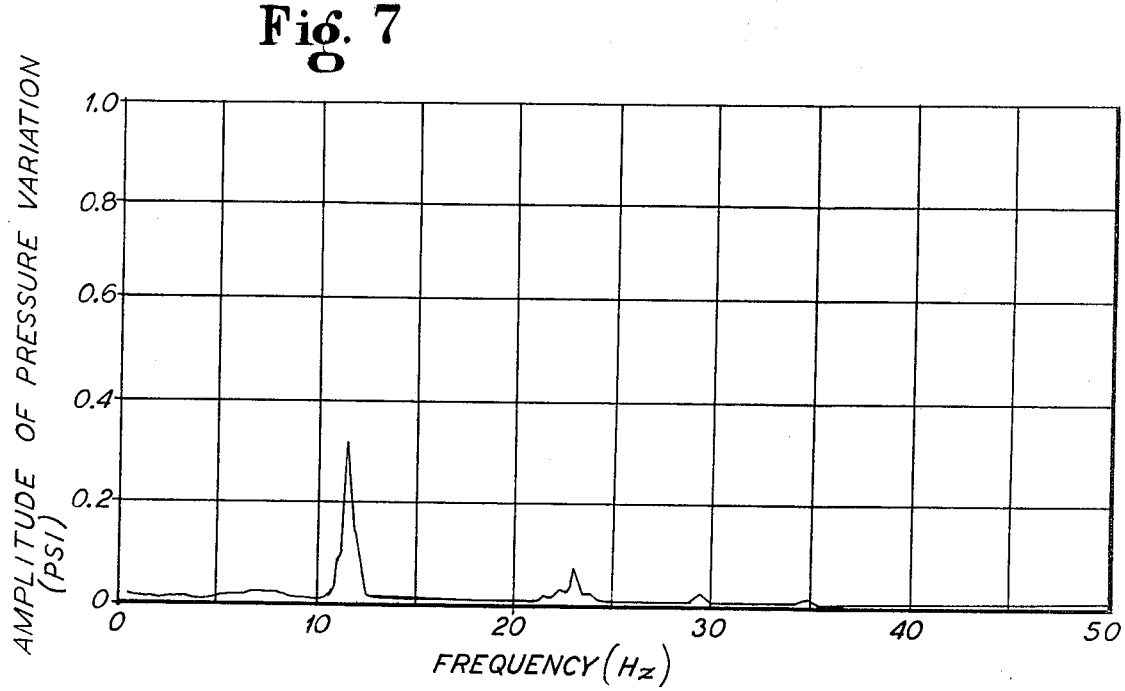
FIG. 7 is a graph plotting the amplitude of variations in stock pressure in the stock delivery line against frequency with no attenuator operative in the circuit.

The insert type attenuator of the present invention is characterized by a flat, horizontal diaphragm structure utilizing only a short space. It is a relatively simple device in that it goes from a round cross section to another essentially round cross section and then back to a round cross section instead of utilizing polygonal sections including broad horizontal portions requiring gradually sloping and hence lengthy transitions. In addition, the device of the present invention is arranged so that it can fit into existing pipe lines usually sloped at an angle near seven degrees without a major restructuring.

Acoustically, the attenuator of the present invention is not an energy absorber, but rather is an energy reflector or bypasser. It is not a tuned reflector but operates over a broad band of frequencies. The insert type attenuator of the present invention has a low shunt impedance compared with the impedance of the stock line, extending over a frequency range of 1 to 30 Hertz, and so provides significant attenuation over this important range.

The drawings illustrate one form of insert type attenuator which can be used in accordance with the present invention. In FIG. 1 reference numeral 10 refers to an outer housing sealed at one end by means of a flange 11 and at the opposite end by means of a flange 12. The attenuator is intended to be inserted into an existing inlet or recirculation line for a paper making headbox, and so its external portions are disposed at an angle of greater than about 6° but not more than about 7° to 10° to the horizontal so that it can be interposed into a conventionally sloped line without significant restructuring and still permit the inner conduit to have a slope greater than 0° and thus provide the required drainage. Inside the housing 10 there is a conduit generally illustrated at reference number 13. The conduit 13 has a nearly horizontal midsection 13a contained between a pair of eccentric reducers 13b and 13c at opposite ends thereof, which reducers connect to an outlet conduit 14 and a coaxial inlet conduit 15, respectively.

The dimensions and configurations of the sections 13a, 13b and 13c are such that the stock when flowing from the inlet to the outlet meets a substantially uniform cross-sectional area, thereby avoiding significant acceleration or deceleration of the suspension and avoiding significant Bernoulli-related changes in pressure.

The interior construction of the attenuator is best illustrated in FIGS. 2 through 4 of the drawings. As best seen in FIG. 3, the conduit 13 may be made up of a number of sections one of which includes an arcuate portion 16 which is welded or otherwise secured at its marginal edges to upper portions 17 and 18 of a pair of slotted blocks. Similarly, an arcuate section 19 may be welded or otherwise secured to lower portions 20 and 21 of the same pair of blocks. Portions 17 and 20 of the same block are additionally coupled together by means of threaded bolts 22. Block portion 17 cooperates with a plate 24 to apply clamping pressure to one side portion of a flexible, continuous reinforced rubber-like diaphragm 25 in the form of an endless loop. Clamping pressure is applied to this side portion of diaphragm 25 by means of nuts 26 and 27. Similarly, block portion 20 cooperates with a plate 28 to apply clamping pressure to this side portion of the lower run of the flexible diaphragm 25 by means of nuts 29 and 30. On the other side, a block portion 18 cooperates with a plate 31 to clamp this other edge of the diaphragm 25 therebetween by means of nuts 32 and 33. Similarly, block portion 21 cooperates with a plate 34 and a pair of nuts 35 and 36 to clamp that portion of the flexible diaphragm 25 therebetween. At the extreme ends of the flexible diaphragm 25, there are provided a pair of transverse rods 41 and 42 about which the diaphragm 25 is trained, as is best illustrated in FIGS. 2 and 4. The rods 41 and 42 are fixedly secured to the conduit by means of bolts 40 as seen in FIG. 4, and seal these portions of the diaphragm.

Between the upper and lower runs of the flexible diaphragm 25 there is a grid work consisting of a plurality of parallel spaced ribs 43 joined together by stiffening members such as rods 44. Disposed in certain ones of the spaces between the ribs 43 is a series of asymmetric blocks 45 composed of a flexible foamed plastic such as polyurethane or the like glued to the ribs 43. These foam blocks 45 form relatively soft compressible spring means which dissipate energy and furnish distributed constraints on the diaphragm runs, contributing to the desired "C" and "R" of the attenuator's acoustic properties, as discussed in general in the aforementioned "Tappi" articles. On occasion, such as during start-ups, the gas pressure may not match the stock pressure acting on the diaphragm. The gridwork provides recessing protection to prevent crushing of the foam to near zero thickness. After repeated crushings, the foam would lose much of the constraint which it furnishes to the diaphragm during normal operation.

The conduit 13 is surrounded by and the space between the diaphragm runs is filled with relatively-uniform-pressure air provided by introducing compressed air into one or more air inlets 47. Interposed between the gas chamber surrounding the conduit 13 and the space between the diaphragm runs are a pair of laminates each comprising a porous felt or cloth 51 (FIGS. 2 and 3) confined between a pair of porous screen members 52 and 53 which may be made of perforated sheet metal. Air diffuses at a substantially uniform pressure in the space between the two horizontally extending flexible diaphragm members. The composite of both fabric and screen members is held against the blocks by means of bolts 54.

Viscous friction of the gas pumped back and forth through the interstices of the porous laminates by the fluctuating motion of the diaphragm runs furnishes a portion of the desired acoustic resistance of the attenuator. As pointed out in the aforementioned "Tappi" publications, this resistance does not contribute to the attenuating action of the attenuator, but is effective to diminish the sharply peaked nature of a resonance.

Valve means are provided which are operable intermittently in response to gross outward deflection of the upper or lower runs of the flexible diaphragm 25, or both, caused by long term stock pressure decreases or gradually accumulating excess of gas pressure, to vent gas from between the runs. These valve means include a pair of closed-end pipes 56 and 57 as best seen in FIGS. 2, 3, 5 and 6. The upper pipe 56 has an aperture 56a therein while the lower pipe 57 has an aperture 57a therein. These apertures are arranged to abut the upper and lower runs of the flexible diaphragm 25, respectively, and when the stock pressure and the sum of the air pressure acting on opposite sides of the runs plus the effective pressure from foam blocks 45 are substantially equal, as illustrated in FIG. 5, the flexible diaphragm 25 closes off the apertures 56a and 57a. When, because of the continuous input of gas and/or a long term decrease in the running average stock pressure, the sum of foam pressure plus the running average gas pressure exceeds the running average stock pressure by a small amount, venting of the gas occurs as one or both of the apertures 56a and 57a become uncovered. As illustrated in FIG. 6, gas is then vented from between the diaphragm runs and from within the housing by means of bleed-off lines 58 and 59 best seen in FIGS. 1, 2 and 3.

The attenuator of the present invention makes use of a flat, essentially horizontal diaphragm occupying only a short space and readily insertable into an existing feed line to a paper making headbox. The diaphragm used is flexible or has a flexible margin. The attenuator of the present invention is not itself an energy absorber, but is an energy reflector. The maximum attenuation achieved according to theory and tests made is more than 10:1. The insert type attenuator of the present invention is preferable to an attenuator located in the headbox because it does not require the restructuring of the headbox. It can be made small in axial length so that it can fit into places other attenuators of comparable attenuating capabilities would not fit. The small overall length is obtained because the attenuator does not require long transition pieces to furnish acceptably-gradual changes from circular to non-circular and back to circular cross sections.

The attenuator of this invention, unlike other large, flat area attenuators, uses a grid which is inserted into the liquid and merely has to withstand crushing forces rather than large unbalanced forces during start-up intervals when the gas pressure has not yet risen to match the liquid pressure.

The results of physical tests which have been made with an attenuator produced according to the present invention are set forth graphically in FIGS. 7 to 10, inclusive.

Figure 8:
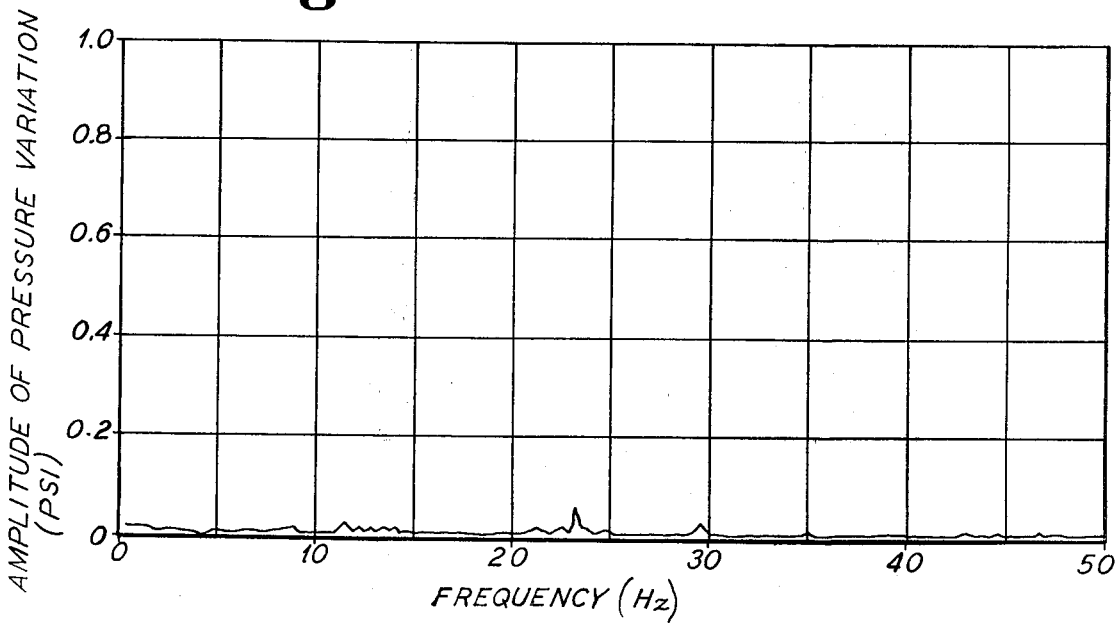
FIG. 8 is a graph similar to FIG. 7 but illustrating the condition when the attenuator is operative.

FIGS. 7 and 8 were obtained from fast Fourier transform spectral analysis of frequency modulated magnetic recordings of the electrical signals furnished by a pressure transducer mounted in the stock piping between the attenuator and a paper machine headbox.

Figure 9:
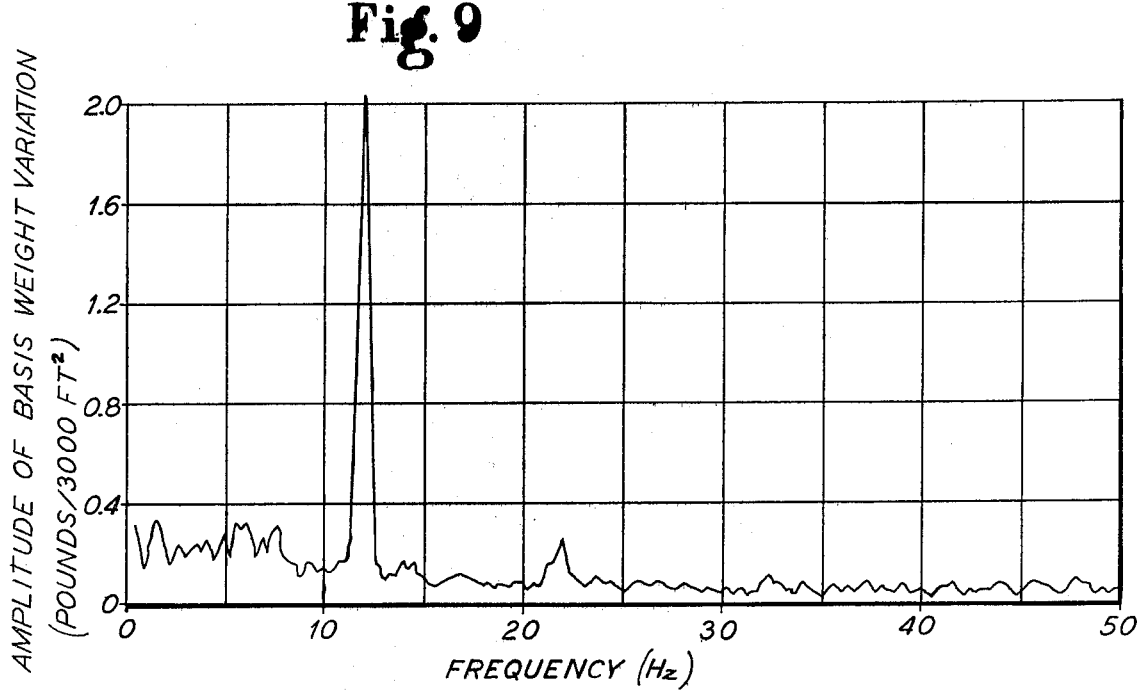
FIG. 9 is a plot of the amplitude of variations in the machine direction in the basis weight of the finished paper itself, plotted against frequency, without the attenuator being operative.
Figure 10:
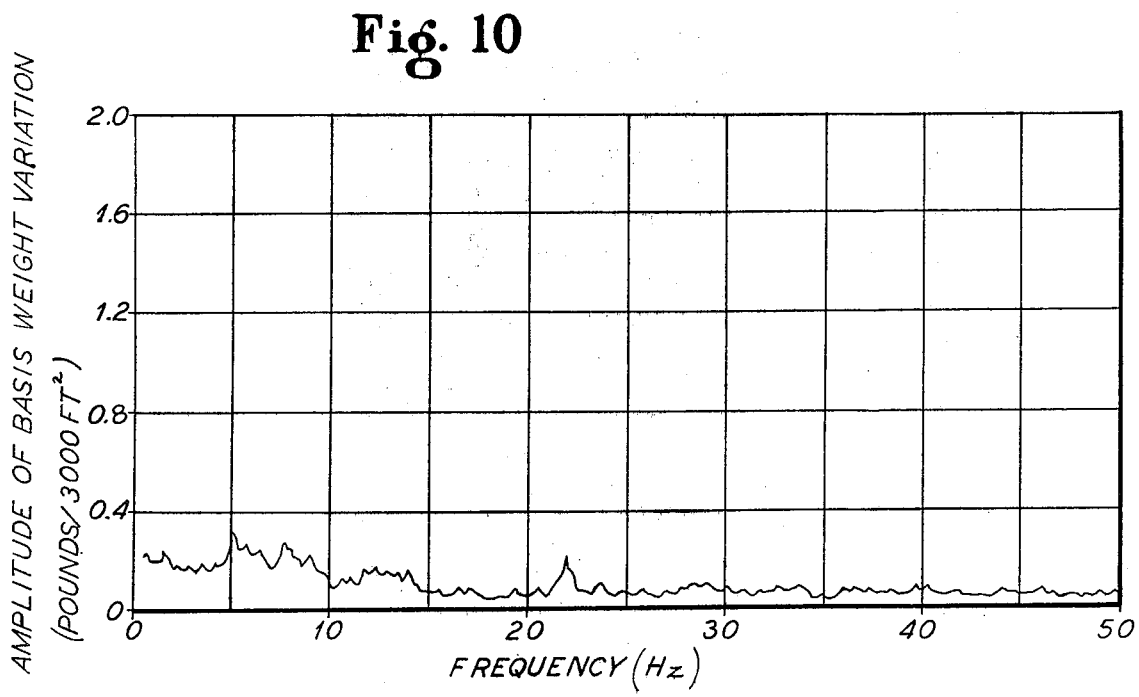
FIG. 10 is a graph similar to FIG. 9 but showing the differing condition occurring when the attenuator was operative.

Similarly, FIGS. 9 and 10 were obtained from recordings of basis weight furnished by an off machine beta gauge. The paper was manufactured at the times of the pressure recordings. Each graph is the average of sixteen successive spectra.

FIG. 7 is a plot of pressure versus frequency at a position in the line beyond the attenuator, with the air supply off, i.e., with the attenuator inoperative. As indicated by the graph, the dominant component of the pressure fluctuation had a frequency of approximately 12 Hertz, which corresponds to the foil frequency of the screen in the stock line. When the air supply was turned on and the system reached equilibrium conditions, this peak at 12 Hertz was essentially eliminated, as indicated in FIG. 8. The reduction was approximately 13 to 1, or 22 db.

The graphs of FIGS. 9 and 10 illustrate measurements taken on the paper itself. The paper produced from the headbox at the same time the pressure readings of FIGS. 7 and 8 were recorded was run through a beta gauge calibrated to furnish electrical signals relatable to basis weight, in pounds per 3,000 square feet. As shown in FIG. 9, there was a dominant machine direction basis weight variation whose wave length corresponded to a frequency of 12 Hertz. As shown in FIG. 10, this component was virtually eliminated when the attenuator was rendered operative. This, plus tests not included here, clearly shows that the attenuator of the present invention is effective in significantly minimizing machine direction variations in paper basis weight at frequencies commonly observed in pulsations in stock lines associated with the header of a headbox.

It should be evident that various modifications can be made to the described embodiments without departing from the scope of the present invention.

I claim as my invention:

1. An insert type attenuator for a liquid or liquid suspension comprising:
    a housing,
    a conduit positioned within said housing,
    a flexible diaphragm having a pair of substantially horizontal spaced runs positioned in said conduit, said pair comprising an upper run and a lower run,
    means for flowing said liquid or liquid suspension through said conduit above one and below the other of said spaced runs,
    means for introducing pressurized air into said housing,
    means for diffusing air from within said housing to between said spaced runs,
    relatively soft compressible spring means between said upper and lower runs spacing said runs apart and providing stiffness and acoustical resistance,
    first valve means positioned adjacent to and below the upper run, and
    second valve means positioned adjacent to and above the lower run,
    said first and second valve means being closed when the pressure of the liquid or liquid suspension is at least equal to the sum of air pressure acting on opposite sides of the runs plus the effective pressure from said spring means, said first and second valve means being opened upon deflection of said upper and lower runs as the sum of spring pressure plus the air pressure exceeds the pressure of the liquid or liquid suspension.

2. An attenuator according to claim 1 in which:
    said valve means includes pipes closed at one end and having apertures abutting said runs to close said valve means when the liquid pressure is at least equal to the gas pressure on said diaphragm.

3. An attenuator according to claim 1 in which:
    the cross sectional area through which the liquid or liquid suspension flows through said attenuator is substantially uniform throughout the length of travel of said liquid or liquid suspension.

4. An attenuator according to claim 1 in which:
    said compressible spring means includes a plastic foam.

5. An attenuator according to claim 4 which includes:
    means for protecting said foam against repeated crushing.

6. An attenuator according to claim 1 in which:
    said housing and said conduit have essentially circular cross sections throughout.

7. An attenuator according to claim 1 in which:
    part of said means for diffusing air is a porous felt or cloth confined between a pair of screen members.

8. An attenuator according to claim 1 in which:
    said spaced runs are opposed sides of an endless belt.

* * * * *